(12) United States Patent
Numata et al.

(10) Patent No.: US 10,570,227 B2
(45) Date of Patent: Feb. 25, 2020

(54) PHOTOPOLYMERIZABLE COMPOSITION

(71) Applicant: Kawasaki Kasei Chemicals Ltd., Kawasaki (JP)

(72) Inventors: Shigeaki Numata, Kawasaki (JP); Shuji Yokoyama, Kawasaki (JP); Yasuaki Miki, Kawasaki (JP); Akihiko Yamada, Kawasaki (JP)

(73) Assignee: Kawasaki Kasei Chemicals Ltd., Kawasaki (JP)

( * ) Notice: Subject to any disclaimer, the term of this patent is extended or adjusted under 35 U.S.C. 154(b) by 0 days.

(21) Appl. No.: 15/758,215

(22) PCT Filed: Sep. 13, 2016

(86) PCT No.: PCT/JP2016/077018
§ 371 (c)(1),
(2) Date: Mar. 7, 2018

(87) PCT Pub. No.: WO2017/047599
PCT Pub. Date: Mar. 23, 2017

(65) Prior Publication Data
US 2018/0208689 A1    Jul. 26, 2018

(30) Foreign Application Priority Data
Sep. 14, 2015 (JP) .................. 2015-181281

(51) Int. Cl.
*C08F 122/10* (2006.01)
(52) U.S. Cl.
CPC ................ *C08F 122/105* (2013.01)
(58) Field of Classification Search
CPC .................................. C08F 122/105
See application file for complete search history.

(56) References Cited

FOREIGN PATENT DOCUMENTS

| JP | 63-150303 A | 6/1988 |
| JP | 4-195043 A | 7/1992 |
| JP | H04195043 A | * 7/1992 |
| JP | 7-33809 A | 2/1995 |
| JP | 2001-81116 A | 3/2001 |
| JP | 2005-314570 A | 11/2005 |
| JP | 2007-114359 A | 5/2007 |

OTHER PUBLICATIONS

International Search Report dated Dec. 20, 2016, in PCT/JP2016/077018, filed Sep. 13, 2016.

* cited by examiner

*Primary Examiner* — Sanza L. McClendon
(74) *Attorney, Agent, or Firm* — Oblon, McClelland, Maier & Neustadt, L.L.P.

(57) ABSTRACT

To provide a photopolymerizable composition which can be quickly cured by light of from 300 nm to 500 nm, and a cured product of which is less colored.

A photopolymerizable composition comprising a compound having an anthracene skeleton represented by the following formula (1), a compound having a benzophenone skeleton and a radical polymerizable compound:

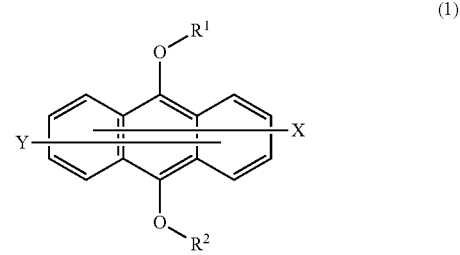

(1)

wherein each of $R^1$ and $R^2$ which may be the same or different, is a $C_{1-20}$ alkyl group, a $C_{6-20}$ aryl group, an alkylcarbonyl group having a $C_{1-20}$ alkyl group, an arylcarbonyl group having a $C_{6-20}$ aryl group, an alkyloxycarbonyl group having a $C_{1-20}$ alkyl group, or an aryloxycarbonyl group having a $C_{6-20}$ aryl group, and each of X and Y which may be the same or different, is a hydrogen atom or a $C_{1-8}$ alkyl group.

16 Claims, No Drawings

PHOTOPOLYMERIZABLE COMPOSITION

CROSS-REFERENCE TO RELATED APPLICATIONS

This application is a National Phase of PCT/JP2016/077018, which was filed on Sep. 13, 2016. This application is based upon and claims the benefit of priority to Japanese Application No. 2015-181281, which was filed on Sep. 14, 2015.

TECHNICAL FIELD

The present invention relates to a photopolymerizable composition, particularly to a photopolymerizable composition comprising a compound having a specific anthracene skeleton, and benzophenone or a compound having a benzophenone skeleton.

BACKGROUND ART

An active energy ray-polymerizable composition which is polymerized and cured by active energy rays, particularly a so-called photopolymerizable composition which is polymerized and cured by being irradiated with ultraviolet rays or visible light, has been widely used in the field of coating, ink, electronic material, etc. This technique of curing a polymerizable composition by active energy rays including ultraviolet rays and visible light, has been used for various applications, for example, a wood coating material, a coating material for e.g. a metal, an ink for screen printing or off-set printing, an ink for an ink jet printer, a dry film resist used for an electronic substrate, a hologram material, a sealing agent, a hard coating agent, an overcoat agent, an optical element such as a lens or a lens sheet, an optical material, a resin for stereolithography, a bonding agent/adhesive.

And, such a photopolymerizable composition mainly comprises a photopolymerizable compound, a photopolymerization initiator which initiates polymerization of the photopolymerizable compound by energy irradiation, and in many cases, a photopolymerization sensitizer which activates the photopolymerization initiator. Particularly, a photoradical polymerizable composition which is polymerized and cured by employing radical polymerization mechanism, comprises a radical polymerizable compound and a radical polymerization initiator, and is industrially very widely used in view of wide range of selection of the composition, easy adjustment of physical properties of a cured product, availability of the polymerizable compound, etc.

The radical polymerization initiator is mainly classified into an intramolecular cleavage type and a hydrogen withdrawal type. In the radical polymerization initiator of the intramolecular cleavage type, by absorption of light having a specific wavelength, a bond at a specific portion is broken, radicals are generated at the broken portion, which function as a polymerization initiator to initiate polymerization of the polymerizable compound. On the other hand, in the case of hydrogen withdrawal type, the radical polymerization initiator absorbs light having a specific wavelength and is in an excited state, the excited species bring about hydrogen withdrawal reaction from a surrounding hydrogen donor and as a result, radicals are generated, which function as a polymerization initiator to initiate polymerization of the polymerizable compound.

As an intramolecular cleavage type radical polymerization initiator, an alkylphenone, an acylphosphine oxide, an oxime ester, etc. have been known (Patent Document 1). On the other hand, as a hydrogen withdrawal type radical polymerization initiator, benzophenone or a compound having a benzophenone skeleton (benzophenone type photoradical polymerization initiator), etc. have been known (Patent Document 2).

A compound having a benzophenone skeleton which is a hydrogen withdrawal type radical polymerization initiator is characterized in that it can suppress coloring of a cured product, however, the compound having a benzophenone skeleton has an absorption region of usually only about 360 nm, and polymerization does not proceed or is not sufficient if the polymerizable composition is to be polymerized and cured by light having a relatively long wavelength, and the compound is not suitable for curing by a long wavelength light. Particularly in a case where the polymerizable composition is polymerized and cured e.g. by a LED having an irradiation wavelength of at least 370 nm which becomes heavily used in recent years, a polymerized product may not be obtained, or the polymerization rate is low and physical properties of the resulting cured product are not sufficient.

PRIOR ART DOCUMENTS

Patent Documents

Patent Document 1: JP-A-S63-150303
Patent Document 2: JP-A-H07-33809

DISCLOSURE OF INVENTION

Technical Problem

It is an object of the present invention to provide a photopolymerizable composition which achieves a sufficient polymerization rate even when a compound having a benzophenone skeleton is used as a photoradical polymerization initiator, and from which a cured product free from problems of coloring can be obtained.

Solution to Problem

The present inventors have conducted extensive studies to achieve the above object and as a result, found that a photopolymerizable composition comprising a benzophenone type photoradical polymerization initiator and a compound having a specific anthracene skeleton as a radical polymerization sensitizer in combination, undergoes a polymerization reaction at a sufficient rate even when irradiated with a long wavelength light, and coloring of a polymerized product obtained by photopolymerizing the photopolymerizable composition can be suppressed, and they have accomplished the present invention.

That is, the present invention has the following constructions.

(1) A photopolymerizable composition comprising a compound having an anthracene skeleton represented by the following formula (1), a compound having a benzophenone skeleton and a radical polymerizable compound:

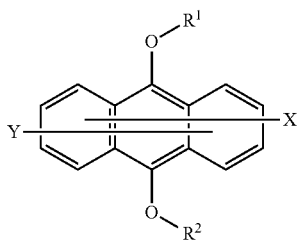

(1)

wherein each of $R^1$ and $R^2$ which may be the same or different, is a $C_{1-20}$ alkyl group, a $C_{6-20}$ aryl group, an alkylcarbonyl group having a $C_{1-20}$ alkyl group, an arylcarbonyl group having a $C_{6-20}$ aryl group, an alkyloxycarbonyl group having a $C_{1-20}$ alkyl group, or an aryloxycarbonyl group having a $C_{6-20}$ aryl group, and each of X and Y which may be the same or different, is a hydrogen atom or a $C_{1-8}$ alkyl group.

(2) The photopolymerizable composition according to (1), wherein the compound having a benzophenone skeleton is a compound represented by the formula (2):

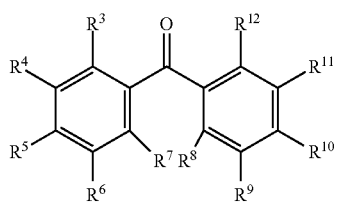

(2)

wherein each of $R^3$ to $R^{12}$ which are independent of one another and which may be the same or different, is a hydrogen atom, an alkyl group, an alkoxy group, an acyl group, an acyloxy group, an aryl group, an aryloxy group, a hydroxy group, a carboxy group, a sulfonic acid group, an alkylthio group, an arylthio group, an amino group, a halogen atom or a vinyl group, two substituents adjacent to each other via a carbon atom on the aromatic ring may be bonded to form a cyclic structure together with the carbon atom, and $R^7$ and $R^8$ may be bonded directly or via an oxygen atom to form a cyclic structure together with the carbon atom.

(3) The photopolymerizable composition according to (1) or (2), which further contains a hydrogen-donating compound.

(4) The photopolymerizable composition according to (3), wherein the hydrogen-donating compound is a compound having at least one functional group selected from an amino group, a hydoxy group, an ether bond and a mercapto group in its molecule.

(5) The photopolymerizable composition according to any one of (1) to (4), which further contains a photoradical polymerization initiator other than the compound having a benzophenone skeleton and the compound having an anthracene skeleton.

(6) The photopolymerizable composition according to (5), wherein the photoradical polymerization initiator is a compound the molecule of which is cleaved by light irradiation to generate radicals.

(7) The photopolymerizable composition according to any one of (1) to (6), wherein the radical polymerizable compound is a compound having at least one ethylenic unsaturated bond.

(8) A cured product obtained by polymerizing the photopolymerizable composition as defined in any one of (1) to (7).

(9) A method for producing a cured product, which comprises irradiating the photopolymerizable composition as defined in any one of (1) to (7) with energy rays.

(10) The method for producing a cured product according to (9), wherein the energy rays contain light having a wavelength within a range of from 300 nm to 500 nm.

Advantageous Effects of Invention

The photopolymerizable composition of the present invention can be polymerized and cured by irradiation with light in a wide wavelength region. Particularly it can be quickly cured by irradiation with a light on a long wavelength side of at least 365 nm, and coloring of a polymerized product or cured product thereof can be suppressed.

The object, characteristics and advantages of the present invention will be described in detail below.

DESCRIPTION OF EMBODIMENTS (Compound Having Anthracene Skeleton)

The compound having an anthracene skeleton in the present invention is a compound having a structure of the formula (1):

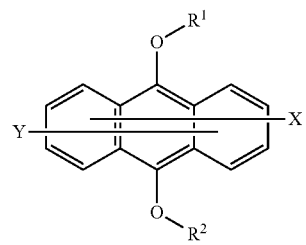

(1)

wherein each of $R^1$ and $R^2$ which may be the same or different, is a $C_{1-20}$ alkyl group, a $C_{6-20}$ aryl group, an alkylcarbonyl group having a $C_{1-20}$ alkyl group, an arylcarbonyl group having a $C_{6-20}$ aryl group, an alkyloxycarbonyl group having a $C_{1-20}$ alkyl group, or an aryloxycarbonyl group having a $C_{6-20}$ aryl group, and each of X and Y which may be the same or different, is a hydrogen atom or a $C_{1-8}$ alkyl group.

In the formula (1), the $C_{1-20}$ alkyl group as each of $R^1$ and $R^2$ may be a linear, branched or cyclic alkyl group such as a methyl group, an ethyl group, a n-propyl group, an i-propyl group, a n-butyl group, an i-butyl group, a n-amyl group, an i-amyl group, a n-hexyl group, a n-heptyl group, a n-octyl group, a 2-ethylhexyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-icosyl group or a cyclohexyl group. The $C_{6-20}$ aryl group may, for example, be a phenyl group, a naphthyl group or an anthranyl group which may have a substituent.

In the formula (1), the alkylcarbonyl group having a $C_{1-20}$ alkyl group represented by each of $R^1$ and $R^2$ may, for example, be an acetyl group, a propionyl group, a n-butanoyl group, an iso-butanonyl group, a n-pentanoyl group, a n-hexanoyl group, a n-heptanonyl group, a n-octanoyl group, a 2-ethylhexanoyl group, a n-nonanoyl group, a n-decanoyl group or a n-dodecanoyl group. Further, the arylcarbonyl group having a $C_{6-20}$ aryl group may, for example, be a benzoyl group or a naphthoyl group.

In the formula (1), the alkyloxycarbonyl group having a $C_{1-20}$ alkyl group represented by each of $R^1$ and $R^2$ may be a linear, branched or cyclic alkyloxycarbonyl group such as a methoxycarbonyl group, an ethoxycarbonyl group, a n-propyloxycarbonyl group, an isopropyloxycarbonyl group, a n-butoxycarbonyl group, an i-butoxycarbonyl group, a sec-butoxycarbonyl group, a tert-butoxycarbonyl group, a n-pentyloxycarbonyl group, a 2,2-dimethylpropyloxycarbonyl group, a cyclopentyloxycarbonyl group, a n-hexyloxycarbonyl group, a cyclohexyloxycarbonyl group, a n-heptyloxycarbonyl group, a 2-methylpentyloxycarbonyl group, a n-octyloxycarbonyl group, 2-ethylhexyloxycarbonyl group, a n-nonyloxycarbonyl group, a n-decyloxycarbonyl group, a n-undecyloxycarbonyl group, a n-dodecyloxycarbonyl group, a n-tridecyloxycarbonyl group, a n-tetradecyloxycarbonyl group, a n-pentadecyloxycarbonyl group, a n-hexadecyloxycarbonyl group, a n-heptadecyloxycarbonyl group, a n-octadecyloxycarbonyl group, a n-nonadecyloxycarbonyl group, a n-icosyloxycarbonyl group or a cyclohexyloxycarbonyl group. The aryloxycarbonyl group having a $C_{6-20}$ aryl group may, for example, be a phenoxycarbonyl group, a 1-naphthyloxycarbonyl group, a 2-naphthyloxycarbonyl group, a 3-phenanthryloxycarbonyl group or a 2-anthryloxycarbonyl group.

In the formula (1), the $C_{1-8}$ alkyl group represented by each of X and Y may, for example, be a methyl group, an ethyl group, a n-propyl group, an i-propyl group, a n-butyl group, an i-butyl group, a n-amyl group, an i-amyl group, a n-hexyl group, a n-heptyl group, a n-octyl group or a 2-ethylhexyl group.

Among the compounds having an anthracene skeleton represented by the formula (1) of the present invention, a compound wherein $R^1$ and $R^2$ are an alkyl group or an aryl group is called an anthracene-9,10-diether compound, and examples of which include the following compounds.

First, in a case where both X and Y are a hydrogen atom, anthracene-9,10-dimethylether, anthracene-9,10-diethylether, anthracene-9,10-dipropylether, anthracene-9,10-dibutylether, anthracene-9,10-diamylether, anthracene-9,10-dihexylether, anthracene-9,10-diheptylether, anthracene-9,10-dioctylether, anthracene-9,10-bis(2-ethylhexyl)ether, anthracene-9,10-didecylether, anthracene-9,10-didodecylether, anthracene-9,10-diphenyl ether and anthracene-9,10-dinaphthylether may, for example, be mentioned.

In a case where X is an alkyl group and Y is a hydrogen atom, 2-methylanthracene-9,10-dimethylether, 2-methylanthracene-9,10-diethylether, 2-methylanthracene-9,10-dipropylether, 2-methylanthracene-9,10-dibutylether, 2-methylanthracene-9,10-diamylether, 2-methylanthracene-9,10-dihexylether, 2-methylanthracene-9,10-diheptylether, 2-methylanthracene-9,10-dioctylether, 2-methylanthracene-9,10-bis(2-ethylhexyl)ether, 2-methylanthracene-9,10-didecylether and 2-methylanthracene-9,10-didodecylether may, for example, be mentioned.

As other examples of the anthracene-9,10-diether compound, 2-chloroanthracene-9,10-dimethylether, 2-chloroanthracene-9,10-diethylether, 2-chloroanthracene-9,10-dipropylether, 2-chloroanthracene-9,10-dibutylether, 2-chloroanthracene-9,10-diamylether, 2-chloroanthracene-9,10-dihexylether, 2-chloroanthracene-9,10-diheptylether, 2-chloroanthracene-9,10-dioctylether, 2-chloroanthracene-9,10-bis(2-ethylhexyl)ether, 2-chloroanthracene-9,10-didecylether and 2-chloroanthracene-9,10-didodecylether may, for example, be mentioned.

As still other examples of the anthracene-9,10-diether compound, 2-phenoxyanthracene-9,10-dimethylether, 2-phenoxyanthracene-9,10-diethylether, 2-phenoxyanthracene-9,10-dipropylether, 2-phenoxyanthracene-9,10-dibutylether, 2-phenoxyanthracene-9,10-diamylether, 2-phenoxyanthracene-9,10-dihexylether, 2-phenoxyanthracene-9,10-diheptylether, 2-phenoxyanthracene-9,10-dioctylether, 2-phenoxyanthracene-9,10-bis(2-ethylhexyl)ether, 2-phenoxyanthracene-9,10-didecyl ether and 2-phenoxyanthracene-9,10-didodecyl ether may, for example, be mentioned.

Among the compounds having an anthracene skeleton represented by the formula (1) of the present invention, a compound wherein $R^1$ and $R^2$ are an alkylcarbonyl group or an arylcarbonyl group is called a 9,10-bis(substituted acyloxy)anthracene compound, and examples of which include the following compounds.

First, in a case where both X and Y are a hydrogen atom, 9,10-diacetyloxyanthracene, 9,10-dipropionyloxyanthracene, 9,10-bis(n-butanoyloxy)anthracene, 9,10-bis(iso-butanoyloxy)anthracene, 9,10-bis(n-pentanoyloxy)anthracene, 9,10-bis(n-hexanoyloxy)anthracene, 9,10-bis(n-heptanoyloxy)anthracene, 9,10-bis(n-octanoyloxy)anthracene, 9,10-bis(2-ethylhexanoyloxy)anthracene, 9,10-bis(n-nonanoyloxy)anthracene, 9,10-bis(n-decanoyloxy)anthracene and 9,10-bis(n-dodecanoyloxy)anthracene may, for example, be mentioned.

Then, in a case where X is an alkyl group and Y is a hydrogen atom, 1-methyl-9,10-diacetyloxyanthracene, 1-methyl-9,10-dipropionyloxyanthracene, 1-methyl-9,10-bis(n-butanoyloxy)anthracene, 1-methyl-9,10-bis(iso-butanoyloxy)anthracene, 1-methyl-9,10-bis(n-hexanoyloxy)anthracene, 1-methyl-9,10-bis(n-heptanoyloxy)anthracene, 1-methyl-9,10-bis(n-octanoyloxy)anthracene, 1-methyl-9,10-bis(2-ethylhexanoyloxy)anthracene, 1-methyl-9,10-bis(n-nonanoyloxy)anthracene, 1-methyl-9,10-bis(n-decanoyloxy)anthracene, 1-methyl-9,10-bis(n-dodecanoyloxy)anthracene, 2-methyl-9,10-diacetyloxyanthracene, 2-methyl-9,10-dipropionyloxyanthracene, 2-methyl-9,10-bis(n-butanoyloxy)anthracene, 2-methyl-9,10-bis(iso-butanoyloxy)anthracene, 2-methyl-9,10-bis(n-hexanoyloxy)anthracene, 2-methyl-9,10-bis(n-heptanoyloxy)anthracene, 2-methyl-9,10-bis(n-octanoyloxy)anthracene, 2-methyl-9,10-bis(2-ethylhexanoyloxy)anthracene, 2-methyl-9,10-bis(n-nonanoyloxy)anthracene, 2-methyl-9,10-bis(n-decanoyloxy)anthracene, 2-methyl-9,10-bis(n-dodecanoyloxy)anthracene, 1-ethyl-9,10-diacetyloxyanthracene, 1-ethyl-9,10-dipropionyloxyanthracene, 1-ethyl-9,10-bis(n-butanoyloxy)anthracene, 1-ethyl-9,10-bis(iso-butanoyloxy)anthracene, 1-ethyl-9,10-bis(n-hexanoyloxy)anthracene, 1-ethyl-9,10-bis(n-heptanoyloxy)anthracene, 1-ethyl-9,10-bis(n-octanoyloxy)anthracene, 1-ethyl-9,10-bis(2-ethylhexanoyloxy)anthracene, 1-ethyl-9,10-bis(n-nonanoyloxy)anthracene, 1-ethyl-9,10-bis(n-decanoyloxy)anthracene, 1-ethyl-9,10-bis(n-dodecanoyloxy)anthracene, 2-ethyl-9,10-diacetyloxyanthracene, 2-ethyl-9,10-dipropionyloxyanthracene, 2-ethyl-9,10-bis(n-butanoyloxy)anthracene, 2-ethyl-9,10-bis(iso-butanoyloxy)anthracene, 2-ethyl-9,10-bis(n-hexanoyloxy)anthracene, 2-ethyl-9,10-bis(n-heptanoyloxy)anthracene, 2-ethyl-9,10-bis(n-octanoyloxy)anthracene, 2-ethyl-9,10-bis(2-ethylhexanoyloxy)anthracene, 2-ethyl-9,10-bis(n-nonanoyloxy)anthracene, 2-ethyl-9,10-bis(n-decanoyloxy)anthracene and 2-ethyl-9,10-bis(n-dodecanoyloxy)anthracene may, for example, be mentioned.

Further, in a case where both X and Y are an alkyl group, 2,3-dimethyl-9,10-diacetyloxyanthracene, 2,3-dimethyl-9,10-dipropionyloxyanthracene, 2,3-dimethyl-9,10-bis(n-butanoyloxy)anthracene, 2,3-dimethyl-9,10-bis(iso-butanoyloxy)anthracene, 2,3-dimethyl-9,10-bis(n-hexanoyloxy) anthracene, 2,3-dimethyl-9,10-bis(n-heptanoyloxy)anthracene, 2,3-dimethyl-9,10-bis(n-octanoyloxy)anthracene, 2,3-dimethyl-9,10-bis(2-ethylhexanoyloxy)anthracene, 2,3-dimethyl-9,10-bis(n-nonanoyloxy)anthracene, 2,3-dimethyl-9,10-bis(n-decanoyloxy)anthracene, 2,3-dimethyl-9,10-bis(n-dodecanoyloxy)anthracene, 2,6-dimethyl-9,10-diacetyloxyanthracene, 2,6-dimethyl-9,10-dipropionyloxyanthracene, 2,6-dimethyl-9,10-bis(n-butanoyloxy)anthracene, 2,6-dimethyl-9,10-bis(iso-butanoyloxy)anthracene, 2,6-dimethyl-9,10-bis(n-hexanoyloxy)anthracene, 2,6-dimethyl-9,10-bis(n-heptanoyloxy)anthracene, 2,6-dimethyl-9,10-bis(n-octanoyloxy)anthracene, 2,6-dimethyl-9,10-bis(2-ethylhexanoyloxy)anthracene, 2,6-dimethyl-9,10-bis(n-nonanoyloxy)anthracene, 2,6-dimethyl-9,10-bis(n-decanoyloxy)anthracene, 2,6-dimethyl-9,10-bis(n-dodecanoyloxy)anthracene, 2,7-dimethyl-9,10-diacetyloxyanthracene, 2,7-dimethyl-9,10-dipropionyloxyanthracene, 2,7-dimethyl-9,10-bis(n-butanoyloxy)anthracene, 2,7-dimethyl-9,10-bis(iso-butanoyloxy)anthracene, 2,7-dimethyl-9,10-bis(n-hexanoyloxy)anthracene, 2,7-dimethyl-9,10-bis(n-heptanoyloxy)anthracene, 2,7-dimethyl-9,10-bis(n-octanoyloxy)anthracene, 2,7-dimethyl-9,10-bis(2-ethylhexanoyloxy)anthracene, 2,7-dimethyl-9,10-bis(n-nonanoyloxy)anthracene, 2,7-dimethyl-9,10-bis(n-decanoyloxy)anthracene and 2,7-dimethyl-9,10-bis(n-dodecanoyloxy)anthracene may, for example, be mentioned.

Among the compounds having an anthracene skeleton represented by the formula (1) of the present invention, a compound wherein $R^1$ and $R^2$ are an alkyloxycarbonyl group or an aryloxycarbonyl group is called a 9,10-bis(substituted carbonyloxy)anthracene compound, and examples of which include the following compounds.

First, in a case where both X and Y are a hydrogen atom, 9,10-bis(methoxycarbonyloxy)anthracene, 9,10-bis(ethoxycarbonyloxy)anthracene, 9,10-bis(n-propoxycarbonyloxy)anthracene, 9,10-bis(i-propoxycarbonyloxy)anthracene, 9,10-bis(n-butoxycarbonyloxy)anthracene, 9,10-bis(i-butoxycarbonyloxy)anthracene, 9,10-bis(n-pentyloxycarbonyloxy)anthracene, 9,10-bis(i-pentyloxycarbonyloxy)anthracene, 9,10-bis(n-hexyloxycarbonyloxy)anthracene, 9,10-bis(n-heptyloxycarbonyloxy)anthracene, 9,10-bis(n-octyloxycarbonyloxy)anthracene, 9,10-bis(2-ethylhexyloxycarbonyloxy)anthracene and 9,10-bis(allyloxycarbonyloxy)anthracene may, for example, be mentioned.

In a case where X is an alkyl group and Y is a hydrogen atom, 1-methyl-9,10-bis(methoxycarbonyloxy)anthracene, 1-methyl-9,10-bis(ethoxycarbonyloxy)anthracene, 1-methyl-9,10-bis(n-propoxycarbonyloxy)anthracene, 1-methyl-9,10-bis(i-propoxycarbonyloxy)anthracene, 1-methyl-9,10-bis(n-butoxycarbonyloxy)anthracene, 1-methyl-9,10-bis(i-butoxycarbonyloxy)anthracene, 1-methyl-9,10-bis(n-pentyloxycarbonyloxy)anthracene, 1-methyl-9,10-bis(i-pentyloxycarbonyloxy)anthracene, 1-methyl-9,10-bis(n-hexyloxycarbonyloxy)anthracene, 1-methyl-9,10-bis(n-heptyloxycarbonyloxy)anthracene, 1-methyl-9,10-bis(n-octyloxycarbonyloxy)anthracene, 1-methyl-9,10-bis(2-ethylhexyloxycarbonyloxy)anthracene, 1-methyl-9,10-bis(allyloxycarbonyloxy)anthracene, 2-methyl-9,10-bis(methoxycarbonyloxy)anthracene, 2-methyl-9,10-bis(ethoxycarbonyloxy)anthracene, 2-methyl-9,10-bis(n-propoxycarbonyloxy)anthracene, 2-methyl-9,10-bis(i-propoxycarbonyloxy)anthracene, 2-methyl-9,10-bis(n-butoxycarbonyloxy)anthracene, 2-methyl-9,10-bis(i-butoxycarbonyloxy)anthracene, 2-methyl-9,10-bis(n-pentyloxycarbonyloxy)anthracene, 2-methyl-9,10-bis(i-pentyloxycarbonyloxy)anthracene, 2-methyl-9,10-bis(n-hexyloxycarbonyloxy)anthracene, 2-methyl-9,10-bis(n-heptyloxycarbonyloxy)anthracene, 2-methyl-9,10-bis(n-octyloxycarbonyloxy)anthracene, 2-methyl-9,10-bis(2-ethylhexyloxycarbonyloxy)anthracene, 2-methyl-9,10-bis(allyloxycarbonyloxy)anthracene, 1-ethyl-9,10-bis(methoxycarbonyloxy)anthracene, 1-ethyl-9,10-bis(ethoxycarbonyloxy)anthracene, 1-ethyl-9,10-bis(n-propoxycarbonyloxy)anthracene, 1-ethyl-9,10-bis(i-propoxycarbonyloxy)anthracene, 1-ethyl-9,10-bis(n-butoxycarbonyloxy)anthracene, 1-ethyl-9,10-bis(i-butoxycarbonyloxy)anthracene, 1-ethyl-9,10-bis(n-pentyloxycarbonyloxy)anthracene, 1-ethyl-9,10-bis(i-pentyloxycarbonyloxy)anthracene, 1-ethyl-9,10-bis(n-hexyloxycarbonyloxy)anthracene, 1-ethyl-9,10-bis(n-heptyloxycarbonyloxy)anthracene, 1-ethyl-9,10-bis(n-octyloxycarbonyloxy)anthracene, 1-ethyl-9,10-bis(2-ethylhexyloxycarbonyloxy)anthracene, 1-ethyl-9,10-bis(allyloxycarbonyloxy)anthracene, 2-ethyl-9,10-bis(methoxycarbonyloxy)anthracene, 2-ethyl-9,10-bis(ethoxycarbonyloxy)anthracene, 2-ethyl-9,10-bis(n-propoxycarbonyloxy)anthracene, 2-ethyl-9,10-bis(i-propoxycarbonyloxy)anthracene, 2-ethyl-9,10-bis(n-butoxycarbonyloxy)anthracene, 2-ethyl-9,10-bis(i-butoxycarbonyloxy)anthracene, 2-ethyl-9,10-bis(n-pentyloxycarbonyloxy)anthracene, 2-ethyl-9,10-bis(i-pentyloxycarbonyloxy)anthracene, 2-ethyl-9,10-bis(n-hexyloxycarbonyloxy)anthracene, 2-ethyl-9,10-bis(n-heptyloxycarbonyloxy)anthracene, 2-ethyl-9,10-bis(n-octyloxycarbonyloxy)anthracene, 2-ethyl-9,10-bis(2-ethylhexyloxycarbonyloxy)anthracene and 2-ethyl-9,10-bis(allyloxycarbonyloxy)anthracene may, for example, be mentioned.

And, in a case where both X and Y are an alkyl group, 2,3-dimethyl-9,10-bis(methoxycarbonyloxy)anthracene, 2,3-dimethyl-9,10-bis(ethoxycarbonyloxy)anthracene, 2,3-dimethyl-9,10-bis(n-propoxycarbonyloxy)anthracene, 2,3-dimethyl-9,10-bis(i-propoxycarbonyloxy)anthracene, 2,3-dimethyl-9,10-bis(n-butoxycarbonyloxy)anthracene, 2,3-dimethyl-9,10-bis(i-butoxycarbonyloxy)anthracene, 2,3-dimethyl-9,10-bis(n-pentyloxycarbonyloxy)anthracene, 2,3-dimethyl-9,10-bis(i-pentyloxycarbonyloxy)anthracene, 2,3-dimethyl-9,10-bis(n-hexyloxycarbonyloxy)anthracene, 2,3-dimethyl-9,10-bis(n-heptyloxycarbonyloxy)anthracene, 2,3-dimethyl-9,10-bis(n-octyloxycarbonyloxy)anthracene, 2,3-dimethyl-9,10-bis(2-ethylhexyloxycarbonyloxy)anthracene, 2,3-dimethyl-9,10-bis(allyloxycarbonyloxy)anthracene, 2,6-dimethyl-9,10-bis(methoxycarbonyloxy)anthracene, 2,6-dimethyl-9,10-bis(ethoxycarbonyloxy)anthracene, 2,6-dimethyl-9,10-bis(n-propoxycarbonyloxy)anthracene, 2,6-dimethyl-9,10-bis(i-propoxycarbonyloxy)anthracene, 2,6-dimethyl-9,10-bis(n-butoxycarbonyloxy)anthracene, 2,6-dimethyl-9,10-bis(i-butoxycarbonyloxy)anthracene, 2,6-dimethyl-9,10-bis(n-pentyloxycarbonyloxy)anthracene, 2,6-dimethyl-9,10-bis(i-pentyloxycarbonyloxy)anthracene, 2,6-dimethyl-9,10-bis(n-hexyloxycarbonyloxy)anthracene, 2,6-dimethyl-9,10-bis(n-heptyloxycarbonyloxy)anthracene, 2,6-dimethyl-9,10-bis(n-octyloxycarbonyloxy)anthracene, 2,6-dimethyl-9,10-bis(2-ethylhexyloxycarbonyloxy)anthracene, 2,6-dimethyl-9,10-bis(allyloxycarbonyloxy)anthracene, 2,7-dimethyl-9,10-bis(methoxycarbonyloxy)anthracene, 2,7-dimethyl-9,10-bis(ethoxycarbonyloxy)anthracene, 2,7-dimethyl-9,10-bis(n-propoxycarbonyloxy)anthracene, 2,7-dimethyl-9,10-bis(i-propoxycarbonyloxy)anthracene, 2,7-dimethyl-9,10-bis(n-butoxycarbonyloxy)anthracene, 2,7- dimethyl-9,10-bis(i-butoxycarbonyloxy)anthracene, 2,7-dimethyl-9,10-bis(n-pentyloxycarbonyloxy)anthracene, 2,7-dimethyl-9,10-bis(i-pentyloxycarbonyloxy)anthracene, 2,7-dimethyl-9,10-bis(n-hexyloxycarbonyloxy)anthracene, 2,7-dimethyl-9,10-bis(n-heptyloxycarbonyloxy)anthracene, 2,7-dimethyl-9,10-bis(n-octyloxycarbonyloxy)anthracene, 2,7-dimethyl-9,10-bis(2-ethylhexyloxycarbonyloxy)anthracene, 2,7-dimethyl-9,10-bis(allyloxycarbonyloxy)anthracene, 1,5-dimethyl-9,10-bis(methoxycarbonyloxy)anthracene, 1,5-dimethyl-9,10-bis(ethoxycarbonyloxy)anthracene, 1,5-dimethyl-9,10-bis(n-propoxycarbonyloxy)anthracene, 1,5-dimethyl-9,10-bis(i-propoxycarbonyloxy)anthracene, 1,5-dimethyl-9,10-bis(n-butoxycarbonyloxy)anthracene 1,5-dimethyl-9,10-bis(i-butoxycarbonyloxy)anthracene, 1,5-dimethyl-9,10-bis(n-pentyloxycarbonyloxy)anthracene, 1,5-dimethyl-9,10-bis(i-pentyloxycarbonyloxy)anthracene, 1,5-dimethyl-9,10-bis(n-hexyloxycarbonyloxy)anthracene, 1,5-dimethyl-9,10-bis(n-heptyloxycarbonyloxy)anthracene, 1,5-dimethyl-9,10-bis(n-octyloxycarbonyloxy)anthracene, 1,5-dimethyl-9,10-bis(2-ethylhexyloxycarbonyloxy)anthracene and 1,5-dimethyl-9,10-bis(allyloxycarbonyloxy)anthracene may, for example, be mentioned.

Further, 2,3-diethyl-9,10-bis(methoxycarbonyloxy)anthracene, 2,3-diethyl-9,10-bis(ethoxycarbonyloxy)anthracene, 2,3-diethyl-9,10-bis(n-propoxycarbonyloxy)anthracene, 2,3-diethyl-9,10-bis(i-propoxycarbonyloxy)anthracene, 2,3-diethyl-9,10-bis(n-butoxycarbonyloxy)anthracene, 2,3-diethyl-9,10-bis(i-butoxycarbonyloxy)anthracene, 2,3-diethyl-9,10-bis(n-pentyloxycarbonyloxy)anthracene, 2,3-diethyl-9,10-bis(i-pentyloxycarbonyloxy)anthracene, 2,3-diethyl-9,10-bis(n-hexyloxycarbonyloxy)anthracene, 2,3-diethyl-9,10-bis(n-heptyloxycarbonyloxy)anthracene, 2,3-diethyl-9,10-bis(n-octyloxycarbonyloxy)anthracene, 2,3-diethyl-9,10-bis(2-ethylhexyloxycarbonyloxy)anthracene, 2,3-diethyl-9,10-bis(allyloxycarbonyloxy)anthracene, 2,6-diethyl-9,10-bis(methoxycarbonyloxy)anthracene, 2,6-diethyl-9,10-bis(ethoxycarbonyloxy)anthracene, 2,6-diethyl-9,10-bis(n-propoxycarbonyloxy)anthracene, 2,6-diethyl-9,10-bis(i-propoxycarbonyloxy)anthracene, 2,6-diethyl-9,10-bis(n-butoxycarbonyloxy)anthracene, 2,6-diethyl-9,10-bis(i-butoxycarbonyloxy)anthracene, 2,6-diethyl-9,10-bis(n-pentyloxycarbonyloxy)anthracene, 2,6-diethyl-9,10-bis(i-pentyloxycarbonyloxy)anthracene, 2,6-diethyl-9,10-bis(n-hexyloxycarbonyloxy)anthracene, 2,6-diethyl-9,10-bis(n-heptyloxycarbonyloxy)anthracene, 2,6-diethyl-9,10-bis(n-octyloxycarbonyloxy)anthracene, 2,6-diethyl-9,10-bis(2-ethylhexyloxycarbonyloxy)anthracene, 2,6-diethyl-9,10-bis(allyloxycarbonyloxy)anthracene, 2,7-diethyl-9,10-bis(methoxycarbonyloxy)anthracene, 2,7-diethyl-9,10-bis(ethoxycarbonyloxy)anthracene, 2,7-diethyl-9,10-bis(n-propoxycarbonyloxy)anthracene, 2,7-diethyl-9,10-bis(i-propoxycarbonyloxy)anthracene, 2,7-diethyl-9,10-bis(n-butoxycarbonyloxy)anthracene, 2,7-diethyl-9,10-bis(i-butoxycarbonyloxy)anthracene, 2,7-diethyl-9,10-bis(n-pentyloxycarbonyloxy)anthracene, 2,7-diethyl-9,10-bis(i-pentyloxycarbonyloxy)anthracene, 2,7-diethyl-9,10-bis(n-hexyloxycarbonyloxy)anthracene, 2,7-diethyl-9,10-bis(n-heptyloxycarbonyloxy)anthracene, 2,7-diethyl-9,10-bis(n-octyloxycarbonyloxy)anthracene, 2,7-diethyl-9,10-bis(2-ethylhexyloxycarbonyloxy)anthracene, 2,7-diethyl-9,10-bis(allyloxycarbonyloxy)anthracene, 1,5-diethyl-9,10-bis(methoxycarbonyloxy)anthracene, 1,5-diethyl-9,10-bis(ethoxycarbonyloxy)anthracene, 1,5-diethyl-9,10-bis(n-propoxycarbonyloxy)anthracene, 1,5-diethyl-9,10-bis(i-propoxycarbonyloxy)anthracene, 1,5-diethyl-9,10-bis(n-butoxycarbonyloxy)anthracene, 1,5-diethyl-9,10-bis(n-butoxycarbonyloxy)anthracene, 1,5-diethyl-9,10-bis(n-pentyloxycarbonyloxy)anthracene, 1,5-diethyl-9,10-bis(i-pentyloxycarbonyloxy)anthracene, 1,5-diethyl-9,10-bis(n-hexyloxycarbonyloxy)anthracene, 1,5-diethyl-9,10-bis(n-heptyloxycarbonyloxy)anthracene, 1,5-diethyl-9,10-bis(n-octyloxycarbonyloxy)anthracene, 1,5-diethyl-9,10-bis(2-ethylhexyloxycarbonyloxy)anthracene and 1,5-diethyl-9,10-bis(allyloxycarbonyloxy)anthracene may, for example, be mentioned.

Among the above-described specific examples of the anthracene-9,10-diether compound, the 9,10-bis(substituted acyloxy)anthracene compound and the 9,10-bis(substituted carbonyloxy)anthracene compound, particularly in view of easiness of preparation and high performance, preferred are anthracene-9,10-dimethyl ether, anthracene-9,10-diethyl ether, anthracene-9,10-dipropyl ether, anthracene-9,10-dibutyl ether, anthracene-9,10-dihexyl ether, anthracene-9,10-diheptyl ether, anthracene-9,10-dioctyl ether, 9,10-diaceyloxyanthracene, 9,10-dipropionyloxyanthracene, 9,10-bis(n-butanoyloxy)anthracene, 9,10-bis(n-hexanoyloxy)anthracene, 9,10-bis(n-heptanoyloxy)anthracene, 9,10-bis(n-octanoyloxy)anthracene, 9,10-bis(2-ethylhexanoyloxy)anthracene, 9,10-bis(n-nonanoyloxy)anthracene, 9,10-bis(methoxycarbonyloxy)anthracene, 9,10-bis(ethoxycarbonyloxy)anthracene, 9,10-bis(n-propoxycarbonyloxy)anthracene, 9,10-bis(i-propoxycarbonyloxy)anthracene, 9,10-bis(n-butoxycarbonyloxy)anthracene, 9,10-bis(i-butoxycarbonyloxy)anthracene and 9,10-bis(2-ethylhexyloxycarbonyloxy)anthracene, and in view of solubility in a solvent and a monomer, etc., more preferred are anthracene-9,1-dibutyl ether, anthracene-9,10-dihexyl ether, anthracene-9,10-diheptyl ether, anthracene-9,10-dioctyl ether, 9,10-bis(n-hexanoyloxy)anthracene, 9,10-bis(n-heptanoyloxy)anthracene, 9,10-bis(n-octanoyloxy)anthracene, 9,10-bis(2-ethylhexanoyloxy)anthracene, 9,10-bis(n-nonanoyloxy)anthracene, 9,10-bis(methoxycarbonyloxy)anthracene, 9,10-bis(ethoxycarbonyloxy)anthracene, 9,10-bis(n-propoxycarbonyloxy)anthracene, 9,10-bis(i-propoxycarbonyloxy)anthracene, 9,10-bis(n-butoxycarbonyloxy)anthracene, 9,10-bis(i-butoxycarbonyloxy)anthracene and 9,10-bis(2-ethylhexyloxycarbonyloxy)anthracene. Further, in view of whiteness of the compound and with a view to remarkably reducing coloring of a cured product obtainable from the photopolymerizable composition of the present invention, further preferred are 9,10-bis(n-hexanoyloxy)anthracene, 9,10-bis(n-heptanoyloxy)anthracene, 9,10-bis(n-octanoyloxy)anthracene, 9,10-bis(2-ethylhexanoyloxy)anthracene, 9,10-bis(n-butoxycarbonyloxy)anthracene, 9,10-bis(i-butoxycarbonyloxy)anthracene and 9,10-bis(2-ethylhexyloxycarbonyloxy)anthracene.

The amount of the compound having an anthracene skeleton used in the present invention is within a range of at least 0.01 wt % and at most 20 wt %, preferably at least 0.1 wt % and at most 10 wt % based on the radical polymerizable compound in the photopolymerizable composition of the present invention. When it is less than 0.01 wt %, the polymerization efficiency will not sufficiently improve, and if it exceeds 20 wt %, the light transmittance may be impaired, and the polymerization efficiency may decrease.

(Method for Producing Compound Having Anthracene Skeleton)

Among the compounds having an anthracene skeleton represented by the above formula (1), the anthracene-9,10-diether compound may be produced, for example, by the method disclosed in JP-A-2003-104925. That is, it may be obtained by reacting an etherifying agent with a 9,10-dihydroxyanthracene compound corresponding to the anthracene-9,10-diether compound represented by the formula (1).

Among the compounds having an anthracene skeleton represented by the above formula (1), the 9,10-bis(substituted acyloxy)anthracene compound may be produced, for example, by the method disclosed in JP-A-2014-01442. That is, it may be obtained by reacting an acylating agent with a 9,10-dihydroxyanthracene compound corresponding to the 9,10-bis(substituted acyloxy)anthracene compound represented by the formula (1) in the presence of a basic compound.

Further, the 9,10-bis(substituted carbonyloxy)anthracene compound may be obtained by reacting a carbonating agent with a 9,10-dihydroxyanthracene compound corresponding to the 9,10-bis(substituted carbonyloxy)anthracene compound in the presence of a basic compound, as disclosed in JP-A-2011-42743, JP-A-2014-70203 or the like.

The compound having an anthracene skeleton represented by the above formula (1) of the present invention is used together with a radical polymerization initiator and has a performance to enhance its polymerization initiation action. Particularly, the compound is characterized in that it is effective also for a hydrogen withdrawal type radical polymerization initiator, and still further, it is effective for a compound having a benzophenone skeleton which is the hydrogen withdrawal type radical polymerization initiator.

(Compound Having Benzophenone Skeleton)

The compound having a benzophenone skeleton of the present invention is not particularly limited so long as it has a benzophenone skeleton. As examples of such a compound, for example, compounds represented by the formula (2) may be mentioned.

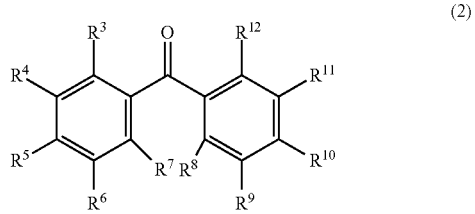

(2)

wherein each of $R^3$ to $R^{12}$ which are independent of one another and which may be the same or different, is a hydrogen atom, an alkyl group, an alkoxy group, an acyl group, an acyloxy group, an aryl group, an aryloxy group, a hydroxy group, a carboxy group, a sulfonic acid group, an alkylthio group, an arylthio group, an amino group, a halogen atom or a vinyl group, two substituents adjacent to each other via a carbon atom on the aromatic ring may be bonded to form a cyclic structure together with the carbon atom, and $R^7$ and $R^8$ may be bonded directly or via an oxygen atom to form a cyclic structure together with the carbon atom.

As specific examples of such a compound, benzophenone, xanthone, fluorenone, 2,4-dichlorobenzophenone, 2,4'-dichlorobenzophenone, 4,4'-dichlorobenzophenone, benzoylbenzoic acid, methyl o-benzoylbenzoate, 4,4'-bis(dimethylamino)benzophenone, 4,4'-bis(diethylamino)benzophenone, 4-phenylbenzophenone, 4-methoxybenzophenone, 4-hydroxybenzophenone, 4,4'-dihydroxybenzophenone, 4-benzoyl-4'-methyldiphenylsulfide, 3,3'-dimethyl-4-methoxybenzophenone, 4,4'-morpholinobenzophenone, 3,3,4,4'-tetra(t-butylperoxycarbonyl)benzophenone, 2,4,6-trimethylbenzophenone and 4,4'-diphenoxybenzophenone may, for example, be mentioned.

The amount of the compound having a benzophenone skeleton used in the present invention is within a range of at least 0.01 wt % and at most 20 wt %, preferably within a range of at least 0.1 wt % and at most 10 wt % based on the radical polymerizable compound in the photopolymerizable composition of the present invention. If it is less than 0.01 wt %, the polymerization initiating ability will decrease, and if it exceeds 20 wt %, light absorption tends to be too significant and in such a case also, the polymerization efficiency may decrease.

(Radical Polymerizable Compound)

The radical polymerizable compound used in the present invention is not particularly limited so long as it has a functional group capable of reacting with radicals (radical polymerizable functional group) in its molecule. Usually, such a functional group may be a functional group having an ethylenic unsaturated bond, such as a (meth)acrylic group or a vinyl group, and as a compound having such a functional group, the following may be mentioned. The compound should contain at least one radical polymerizable functional group, and it may contain 2 or more.

As specific examples of such a compound, methyl (meth)acrylate, ethyl (meth)acrylate, propyl (meth)acrylate, butyl (meth)acrylate, 2-ethylhydroxy (meth)acrylate, 2-hydroxypropyl (meth)acrylate, 2-ethylhexyl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, phenoxypolyethylene glycol (meth)acrylate, nonylphenoxyethyl (meth)acrylate, nonylphenoxytetraethylene glycol (meth)acrylate, methoxydiethylene glycol (meth)acrylate, ethoxydiethylene glycol (meth)acrylate, butoxyethyl (meth)acrylate, butoxytriethylene glycol (meth)acrylate, 2-ethylhexyl polyethylene glycol (meth)acrylate, nonylphenyl polypropylene glycol (meth)acrylate, methoxydipropylene glycol (meth)acrylate, glycidyl (meth)acrylate, glycerol (meth)acrylate, polyethylene glycol (meth)acrylate, polypropylene glycol (meth)acrylate, epichlorohydrin-modified butyl (meth)acrylate, epichlorohydrin-modified phenoxy (meth)acrylate, ethylene oxide (EO)-modified phthalic acid (meth)acrylate, EO-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, morpholino (meth)acrylate and EO-modified phthalic acid (meth)acrylate may, for example, be mentioned. Monofunctional (meth)acrylates such as a (meth)acrylate having an imide group, such as imide (meth)acrylate (tradename: M-140, manufactured by TOAGOSEI CO., LTD) may be mentioned.

Further, bifunctional (meth)acrylates such as 2,2-bis(meth)acryloyloxyphenyl)propane, 2,2-bis[4-(3-(meth)acryloyloxy)-2-hydroxypropoxyphenyl]propane, 2,2-bis(4-(meth)acryloyloxyphenyl)propane, 2,2-bis(4-(meth)acryloyloxypolyethoxyphenyl)propane, 2,2-bis(4-(meth)acryloyloxydiethoxyphenyl)propane, 2,2-bis(4-(meth)acryloyloxytetraethoxyphenyl)propane, 2,2-bis(4-(meth)acryloyloxypentaethoxyphenyl)propane, 2,2-bis(4-(meth)acryloyloxydipropoxyphenyl)propane, 2(4-(meth)acryloxydiethoxyphenyl)-2(4-(meth)acryloyloxytriethoxyphenyl)propane, 2(4-(meth)acryloyloxydipropoxyphenyl)-2-(4-(meth)

acryloyloxytriethoxyphenyl)propane, 2,2-bis(4-(meth)acryloyloxypropoxyphenyl)propane, 2,2-bis(4-(meth)acryloyloxyisopropoxyphenyl)propane, ethylene glycol dimethacrylate, diethylene glycol dimethacrylate, triethylene glycol di(meth)acrylate, tetraethylene glycol di(meth)acrylate, neopentyl glycol di(meth)acrylate, 1,3-butanediol di(meth)acrylate, 1,4-butanediol di(meth)acrylate, 1,6-hexanediol di(meth)acrylate and acrylates corresponding to such methacrylates, and 1,2-bis(3-methacryloyloxy-2-hydroxypropoxy)ethyl may be mentioned.

Further, trifunctional and higher functional (meth)acrylates such as methacrylates such as trimethylolpropane tri(meth)acrylate, trimethylolethane tri(meth)acrylate, pentaerythritol tri(meth)acrylate, trimethylolmethane tri(meth)acrylate and acrylates corresponding to such methacrylates, and pentaerythritol tetra(meth)acrylate, pentaerythritol tetracrylate, dipentaerythritol penta(meth)acrylate, dipentaerythritol hexa(meth)acrylate, glycerine tri(meth)acrylate and tris(2-hydroxyethyl)isocyanurate tri(meth)acrylate may be mentioned.

Still further, styrene derivatives such as styrene, vinyl toluene, α-methylstyrene, chlorostyrene, styrenesulfonic acid and their salts, and vinyl compounds such as vinyl esters such as vinyl acetate, vinyl propionate, vinyl pivalate, vinyl benzoate and vinyl cinnamate may be mentioned, and allyl compounds such as allyl (meth)acrylate, divinylbenzene, triallyl (iso)cyanurate, diallyl iso(tere)phthalate, diallyl isocyanurate and maleic acid diallyltris(2-acryloyloxyethylene) isocyanurate, and maleimides such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide may be mentioned.

Further, oligomers, polymers, etc. containing the above-described radical polymerizable functional groups such as (meth)acrylic groups or vinyl groups may be used.

Such radical polymerizable compounds may be used alone or in combination of two or more. Among such radical polymerizable compounds, in view of high radical polymerizability, availability, etc., (meth)acrylates and styrene derivatives are preferred.

Further, as the radical polymerizable compound, a photopolymerizable compound having an alkali-soluble substituent such as a carboxy group, a phenolic hydroxy group or a sulfonic acid group in its molecule may be used. In a case where an alkali-soluble polymerizable compound is used, a photopolymerizable composition containing such a compound is polymerized and cured by light irradiation through a mask having a pattern, followed by alkali development, whereby an unpolymerized photopolymerizable composition at a masked portion is removed and a pattern can be formed.

Further, it is possible to introduce e.g. a quinone diazide structure to the polymerizable compound to make the polymerizable compound be alkali-soluble by light irradiation.

Still further, a monofunctional or multifunctional thiol may be mixed with such a photopolymerizable compound to form a composition which may undergo the thiol-ene reaction.

(Hydrogen-donating Compound)

Of the photopolymerizable composition of the present invention, polymerization starts by the compound having a benzophenone skeleton in accordance with the following polymerization initiation mechanism. That is, the compound having a benzophenone skeleton is in an excited state by light irradiation. Then, the excited molecules withdraw hydrogen from the compound in their vicinity, radicals are generated on the compound from which the hydrogen is withdrawn, which function as the radical polymerization initiation site. As a result, the compound having a benzophenone skeleton has a role as a photoradical polymerization initiator. That is, when a compound from which hydrogen can be withdrawn is present together with the compound having a benzophenone skeleton, polymerization starts in accordance with the above polymerization initiation mechanism. Accordingly, for example, when hydrogen is withdrawn from the radical polymerizable compound used in the present invention, the polymerization may start at the compound.

Further, in the photopolymerizable composition of the present invention, a hydrogen-donating compound from which hydrogen is more likely to be withdrawn may also be incorporated. In such a case, transfer of hydrogen from the hydrogen-donating compound to molecules of the compound having a benzophenone skeleton which are excited by light irradiation will be more smoothly conducted, and the polymerization may more efficiently proceed.

The hydrogen-donating compound used in the present invention may be any compound which can smoothly donate hydrogen to molecules of the compound having a benzophenone skeleton which are excited by light irradiation.

As such a compound, for example, compounds having an amino group such as diethylamine, diphenylamine, triethylamine, tributylamine, diethanolamine, triethanolamine, N,N-diethylethanolamine, N,N-diethylmethylamine, dipropylamine, N,N-dimethylaniline, ethyl p-diethylaminobenzoate and ethyl p-dimethylaminobenzoate, compounds having a hydroxy group such as methanol, ethanol, propanol, isopropyl alcohol, butanol, ethylene glycol, propylene glycol, butanediol and phenol, compounds having an ether bond such as tetrahydrofuran, tetrahydropyran, dioxane, trioxane, diethylene glyocol, dipropylene glycol, propylene glycol monomethyl ether and propylene glycol monomethyl ether acetate, mercapto compounds such as butanethiol, propanethiol, hexanedithiol, decanedithiol, n-dodecylmercaptan, dodecyl(4-methylthio)phenyl ether, benzenethiol, 4-dimethylmercaptobenzene, 2-mercaptoethanol, 1-mercapto-2-propanol, 3-mercapto-2-butanol, 3-mercapto-1,2-propanediol and mercaptophenol, or disulfides having such mercapto compounds oxidized, and compounds having a mercapto group such as butyl thioglycolate, ethylene glycol bisthioglycolate, ethylene glycol bisthiopropionate, butanediol bis(3-mercaptoisobutyrate), 1,4-butanediol bisthioglycolate, 1,4-butanediol bisthiopropionate, octyl β-mercaptopropionate, methoxybutyl β-mercaptopropionate, trishydroxyethyl tristhiopropionate, trimethylolpropane tris(3-mercaptoisobutyrate), trimethylolpropane tris(3-mercaptobutyrate), trimethylolpropane tris(3-mercaptopropionate), trimethylolpropane tris(β-thiopropionate), trimethylolpropane tristhioglycolate, trimethylolpropane tristhiopropionate, pentaerythritol tetrakis(3-mercaptopropionate), pentaerythritol tetrakis thioglycolate, pentaerythritol tetrakis thiopropionate, thioglycolic acid, thiosalicylic acid, thiomalic acid, mercaptoacetic acid, 2-mercaptoethanesulfonic acid, 2-mercaptonicotinic acid, 2-mercaptopropionic acid, 3-mercaptopropanesulfonic acid, 3-mercaptopropionic acid, 3-mercaptobutyric acid, 4-mercaptobutanesulfonic acid, 3-[N-(2-mercaptoethyl)amino]propionic acid, 3-[N-(2-mercaptoethyl)carbamoyl]propionic acid, 2-mercapto-3-pyridinol, 2-mercaptoimidazole, 2-mercaptoethylamine, 2-mercaptobenzoimidazole, 2-mercaptobenzothiazole, 6-trimercapto-s-triazine, N-(2-mercaptopropionyl)glycine, N-(3-mercaptopropionyl)alanine, diisopropylthioxanthone, diethylthioxanthone, thiophosphates, and trimercaptopropionic acid tris(2-hydroxyethyl)isocyanurate may, for example, be suitably used.

In view of low energy for transfer of hydrogen, compounds having an amino group are particularly suitably used, and among them, ethyl N,N-dimethylbenzoate, ethyl N,N-diethylaminobenzoate and the like are more preferably used.

The amount of the hydrogen-donating compound used in the present invention, if used, is usually within a range of at least 0.01 wt % and at most 50 wt %, preferably at least 0.1 wt % and at most 20 wt %, based on the radical polymerizable compound in the photopolymerizable composition of the present invention.

(Photoradical Polymerization Initiator)

The photopolymerizable composition of the present invention may undergo photopolymerization as it is, or may further contain a photoradical polymerization initiator other than the compound having a benzophenone skeleton and the compound having an anthracene skeleton.

In such a case, a photoradical polymerization initiator of a hydrogen withdrawal type like the compound having a benzophenone skeleton may be used, or a photoradical polymerization initiator of an intramolecular cleavage type which is decomposed by irradiation with light to generate radicals may be used.

As such an intramolecular cleavage type photoradical polymerization initiator, for example, benzyl methyl ketals such as 2,2-dimethoxy-1,2-diphenylethan-1-one (tradename "IRGACURE 651", manufactured by BASF, IRGACURE is a registered trademark of BASF), α-hydroxyalkylphenones such as 1-hydroxycyclohexyl phenyl ketone (tradename "IRGACURE 184", manufactured by BASF), 2-hydroxy-2-methyl-1-phenylpropan-1-one (tradename "DAROCUR 1173", manufactured by BASF, DAROCUR is a registered trademark of BASF), 1-[4-(2-hydroxyethoxy)-phenyl]-2-hydroxy-2-methyl-1-propan-1-one (tradename "IRGACURE 2959", manufactured by BASF), and 2-hydroxy-1-{4-[4-(2-hydroxy-2-methylpropionyl)-benzyl]phenyl}-2-methyl-1-one (tradename "IRGACURE 127", manufactured by BASF), α-aminoacetophenones such as 2-methyl-1-[4-(methylthio)phenyl]-2-morpholinopropan-1-one (tradename "IRGACURE 907", manufactured by BASF) and 2-benzyl-2-dimethylamino-1-(4-morpholinophenyl)-butanone-1 (tradename "IRGACURE 369", manufactured by BASF), acetophenones such as acetophenone, 2-hydroxy-2-phenylacetophenone, 2-ethoxy-2-phenylacetophenone, 2-methoxy-2-phenylacetophenone, 2-isopropoxy-2-phenylacetophenone and 2-isobutoxy-2-phenylacetophenone, benzyls such as benzyl and 4,4'-dimethoxybenzyl, anthraquinones such as 2-ethylanthraquinone and 2-t-butylanthraquinone, phosphine oxides such as bis(2,4,6-trimethylbenzoyl)-phenylphosphine oxide and 2,4,6-trimethyl- benzoyldiphenyl-phosphine oxide, (keto)oxime esters such as 1,2-octanedione 1-[4-(phenylthio)-2-(o-benzoyloxime)] and 1-[9-ethyl-6-(2-methylbenzoyl)-9H-carbazol-3-yl]-1-(o-acetyloxime), and titanocenes, benzophenones, imidazole derivatives, bisimidazole derivatives, N-arylglycine derivatives, organic azide compounds, aluminate complexes, organic peroxides, N-alkoxypyridinium salts and thioxanthone derivatives may, for example, be mentioned. Needless to say, the intramolecular cleavage type photoradical polymerization initiator is not limited to such examples within a range of the scope of the present invention. They may be used alone or in combination of two or more.

The amount of the photoradical polymerization initiator if used is usually within a range of at least 0.001 wt % and at most 20 wt %, preferably within a range of at least 0.01 wt % and at most 10 wt % based on the radical polymerizable compound in the photopolymerizable composition of the present invention. They may be used alone or in combination of two or more.

(Other Component)

Further, to the photopolymerizable composition of the present invention, a solvent may be added as the case requires. The solvent to be used is not particularly limited and may, for example, be suitably a hydrocarbon compound such as hexane, heptane, cyclohexane or decalin, a halogenated hydrocarbon such as chloroform, carbon tetrachloride or dichloromethane, an aromatic compound such as benzene, toluene or xylene, a halogenated aromatic compound such as chlorobenzene, an ether compound such as diethyl ether, tetrahydrofuran, tetrahydropyran, dioxane, propylene glycol monomethoxyacetate or diglyme, a ketone compound such as acetone, methyl ethyl ketone, methyl isobutyl ketone or cyclohexanone, or an ester compound such as ethyl acetate or butyl acetate.

Further, in the photopolymerizable composition of the present invention, a polymerization inhibitor, a chain transfer agent, etc. regarding radical polymerization may be incorporated. The polymerization inhibitor may, for example, be a phenol such as hydroquinone, methoxyhydroquinone, t-butyl catechol or naphthohydroquinone, a naphthol such as 1-naphthol, 2-naphthol or 4-methoxy-1-naphthol, a quinone such as benzoquinone, naphthoquinone, anthraquinone or hydroxynaphthoquinone, 2,2,6,6-tetramethylpiperidinyl-1-oxyl (TEMPO) or 4-hydroxy-2,2,6,6-tetramethylpyperidinyl-1-oxyl.

In the photopolymerizable composition of the present invention, further, within a range not to impair the effects of the present invention, various resin additives such as a coloring agent such as a pigment or a dye, an organic or inorganic filler, a leveling agent, a surfactant, a defoaming agent, a thickener, a flame retardant, an antioxidant, a stabilizer, a lubricant, a plasticizer and a water repellent may be incorporated within a conventional range.

The coloring agent may, for example, be a black pigment, a yellow pigment, a red pigment, a blue pigment or a white pigment. The black pigment may, for example, be carbon black, acetylene black, lamp black or aniline black. The yellow pigment may, for example, be chrome yellow, zinc chromate, cadmium yellow, yellow oxide, mineral fast yellow, nickel titanium yellow, naples yellow, naphthol yellow S, hansa yellow G, hansa yellow 10G, benzidine yellow G, benzidine yellow GR, quinoline yellow lake, permanent yellow NCG or tartrazine lake. The red pigment may, for example, be red iron oxide, cadmium red, red lead, cadmium mercury sulfide, permanent red 4R, lithol red, lake red D brilliant carmine 6B, eosin lake, rhodamine lake B, alizarin lake or brilliant carmine 3B. The blue pigment may, for example, be Prussian blue, cobalt blue, alkali blue lake, Victoria blue lake, phthalocyanine blue, metal free phthalocyanine blue, phthalocyanine blue partial chloride, fast sky blue or Indanthrene blue BC. The white pigment may, for example, be zinc oxide, titanium oxide, antimony trioxide or zinc sulfide. Other pigment may, for example, be baryta powder, barium carbonate, clay, silica, white carbon, talc or alumina white.

(Polymerization and Curing of Photopolymerizable Composition)

The photopolymerizable composition of the present invention may readily be polymerized and cured by light irradiation. Further, the photopolymerizable composition of the present invention can be polymerized and cured by various methods. For example, the photopolymerizable composition may be applied to a proper substrate or sandwiched between e.g. glass plates with a spacer interposed therebetween, and irradiated with light to obtain a coating film or a film or sheet. Further, the photopolymerizable composition may be poured into a mold which transmits light and irradiated with light to obtain a polymerized and cured formed product. Further, the photopolymerizable composition may be applied and then irradiated with light through a mask having an appropriate pattern, whereby it is polymerized and cured depending on the pattern. Otherwise, the photopolymerizable composition discharged from a nozzle of an ink jet printer is irradiated with light to polymerize and cure the composition applied on a substrate, or to form a three-dimensional product while the composition is polymerized.

Further, the photopolymerizable composition may be charged into an appropriate reactor such as a flask and irradiated with light with stirring as the case requires, whereby the photopolymerizable compound in the reactor is photopolymerized. Such polymerization by light irradiation may be carried out in an inert atmosphere or may be carried out in the atmosphere. For example, in a case where the photopolymerizable composition of the present invention contains a radical polymerizable compound, by conducting photopolymerization in an inert atmosphere, generated radicals will hardly be consumed by oxygen, and the polymerization efficiently proceeds in some cases.

(Light Source)

As a light source used for light irradiation in the present invention, a light source which emits light having a wavelength of from 300 to 500 nm is preferably used. It may be a light source which emits light having a plurality of wavelength components or may be a light source which emits so-called monochromatic light and which employs a LED or a laser beam. Specifically, a high pressure mercury lamp, a ultrahigh pressure mercury metal halide lamp, a gallium-doped lamp, a microwave excited UV lamp (for example, H bulb, D bulb or V bulb manufactured by FUSION), or a LED lamp or a laser which emits light having a wavelength of 365 nm, 375 nm, 385 nm, 395 nm, 405 nm, 436 nm or the like. Sunlight or light from lighting equipment such as an incandescent lamp or a fluorescent lamp may be used. Particularly, a LED lamp which emits light having a wavelength of 365 nm, 375 nm, 385 nm, 395 nm, 405 nm, 436 nm or the like is preferred.

(Application of Photopolymerizable Composition)

The photopolymerizable composition of the present invention can be used for e.g. a coating agent, a coating material, an ink or a forming material which is reacted, polymerized and cured by light irradiation. Specifically, it is applicable to a coating material to be applied on a substrate of e.g. a metal, a resin, glass, paper or wood, a coating agent or a protective film material such as a hard coating agent, an antifouling film, an antireflection film, an impact buffer film or an overcoating agent, a photocurable adhesive or bonding agent, a photo-degradative/decomposable coating material, a coating film or a formed product, an optical recording medium such as a hologram material or a material for an optical recording medium, a material for stereolithography, an ink (resin) for a 3D printer, a resist for production of an electronic circuit or a semiconductor, a resist for a color filter to be used for a display such as an organic EL display, a resist to be used for an electronic material such as a resist for a black matrix or a dry film resist, an interlayer insulating film, a protective film, a light extraction film, a sealing agent, a sealing material, an ink for printing such as screen printing, offset printing or gravure printing, a photocurable ink to be used for an ink jet printer, a composition for laser patterning, an optical member such as a lens, a lens array, an optical waveguide, a light guide plate, a light diffusion plate, a diffractive element or an optical adhesive, and a material for nanoimprinting. The photopolymerizable sensitizer composition and the photopolymerizable composition of the present invention, of which a polymerized product and a cured product are hardly colored, are particularly suitable for an adhesive such as an OCA (Optically Clear Adhesive) or an OCR (Optical Clear Resin) to be used for an imaging device such as a LCD or an organic EL display, or an optical device such as a touch panel or a lens, a bonding agent, a coating agent, etc.

EXAMPLES

Now, the present invention will be described in further detail with reference to Examples. However, Examples are merely exemplified as examples. That is, the following Examples are not exhaustive nor intended to restrict the present invention as described. Accordingly, the present invention is by no means restricted to the following Examples within a range not to exceed the scope of the present invention. Further, unless otherwise specified, all the parts and percentages are based on the weight.

<Measurement of Light DSC>

In Examples, light DSC measurement was conducted as follows. As the DSC measurement apparatus, XDSC-7000 manufactured by Hitachi High-Technologies Corporation was used, and a light DSC measurement unit was attached thereto so that DSC measurement could be conducted with light irradiation.

As a light source for light irradiation, LA-410UV manufactured by HAYASHI WATCH-WORKS CO., LTD. was used, and a band-pass filter was used so that 405 nm light or 365 nm light could be extracted and applied to the sample. The illuminance of light was set at 50 mW/cm$^2$ or 10 mW·cm$^2$. The light from the light source was guided to an upper portion of the sample by glass fibers, and the shutter of the light source was trigger-controlled so that DSC measurement could be conducted simultaneously with initiation of light irradiation.

To measure light DSC, about 1 mg of the sample was accurately weighed in a measurement aluminum pan, the pan was accommodated in a DSC measurement portion, and the light DSC unit was attached. Then, the system was left at rest for 5 minutes while the interior of the measurement portion was maintained in a nitrogen atmosphere, and measurement was initiated. Measurement was continued ten minutes while ordinary light was applied. After the first measurement, measurement was conducted again under the same conditions while the sample was left as it was, and a value obtained by subtracting the second measurement result from the first measurement result was taken as the measurement result of the sample. The result was compared by the gross heating value per 1 mg of the sample in one minute after light irradiation, unless otherwise specified. The photoreaction was not completed in one minute in some cases depending upon the measurement conditions, however, in order to compared the reaction behavior at the initial stage of light irradiation, the result was compared by the gross heating value in one minute.

In a case where the sample (photopolymerizable composition) is polymerized by light irradiation, heat of reaction will be generated accompanying the polymerization, and the heat of reaction can be measured by light DSC. Accordingly, the degree of progress of polymerization by light irradiation can be measured by light DSC. In Examples, the gross heating value in one minute after light irradiation is employed, and it is considered that the larger the gross heating value in one minute, the more effectively the polymerization proceeds, so long as the same radical polymerizable compound is used.

<Yellowness Measurement>

The yellowness in Examples indicates the degree how the hue departs from colorless or white to the yellow direction, and is as defined in JIS K7373.

In Examples, the yellowness was determined as follows. That is, using a spectrophotometer UV-2600 manufactured by SHIMADZU CORPORATION, the transmission spectrum of a cured coating film within a wavelength range of from 380 nm to 780 nm was measured, and then the yellowness was calculated by means of a hue analysis software "color measurement" manufactured by SHIMADZU CORPORATION.

Example 1

0.1 Part by weight of 9,10-bis(n-octanoyloxy)anthracene (compound DOA) as the compound having an anthracene skeleton, 0.5 part by weight of benzophenone (BP) as the compound having a benzophenone skeleton and 100 parts by weight of trimethylolpropane triacrylate (TMPTA) as the radical polymerizable compound were mixed with stirring at room temperature until the solid content disappeared to obtain a photopolymerizable composition. About 1 mg of the photopolymerizable compound was accurately weighed and put in a measurement aluminum pan, and light DSC measurement of the photopolymerizable composition was conducted while light having a wavelength of 405 nm with an illuminant of 50 mW/cm$^2$ was applied, whereupon the gross heating value in one minute from initiation of light irradiation was 6.2 mJ/mg. The results are shown in Table 1.

Examples 2 to 4

Light DSC measurement was conducted in the same manner as in Example 1 except that as the compound having a benzophenone skeleton, methyl 2-benzoylbenzoate (MBB) in Example 2, 4-benzoyl 4'-methyldiphenylsulfide (BMS) in Example 3 or 4-phenylbenzophenone (PBZ) in Example 4 was used instead of benzophenone in Example 1. The results are shown in Table 1.

Examples 5 to 8

In Examples 5 to 8, light DSC measurement was conducted in the same manner as in Examples 1 to 4 except that 0.5 part by weight of ethyl N,N-dimethylaminobenzoate (DMAEB) as the hydrogen donor was further added to the compositions in Examples 1 to 4, respectively. The results are shown in Table 1.

Examples 9 to 11

In Examples 9 to 11, light DSC measurement was conducted in the same manner as in Examples 1 to 3 except that as the radical polymerizable compound, polyethylene glycol diacrylate (A-400) was used instead of trimethylolpropane triacrylate (TMPTA) in Examples 1 to 3. The results are shown in Table 1.

Example 12

In Example 12, light DSC measurement was conducted in the same manner as in Example 9 except that as the compound having an anthracene skeleton, DBA (anthracene-9,10-dibutyl ether) was used instead of DOA. The results are shown in Table 1.

Example 13

In Example 13, light DSC measurement was conducted in the same manner as in Example 1 except that as the radical polymerizable compound, polypropylene glycol diacrylate (APG-400) was used instead of trimethylolpropane triacrylate (TMPTA) in Example 1. The results are shown in Table 1.

Example 14

In Example 14, light DSC measurement was conducted in the same manner as in Example 3 except that as the compound having an anthracene skeleton, 9,10-bis(acetyloxy)anthracene (compound DAA) was used instead of 9,10-bis(n-octanoyloxy)anthracene (compound DOA) in Example 3. The results are shown in Table 1.

Example 15

In Example 15, light DSC measurement was conducted in the same manner as in Example 3 except that 0.5 part by weight of ethyl N,N-dimethylaminobenzoate (DMAEB) as the hydrogen donor was further added to the composition in Example 14. The results are shown in Table 1.

Example 16

In Example 16, light DSC measurement was conducted in the same manner as in Example 3 except that as the compound having an anthracene skeleton, 9,10-bis(isobutyloxycarbonyloxy)anthracene (compound DBCA) was used instead of 9,10-bis(n-octanoyloxy)anthracene (compound DOA) in Example 3. The results are shown in Table 1.

Example 17

In Example 17, light DSC measurement was conducted in the same manner as in Example 3 except that 0.5 part by weight of ethyl N,N-dimethylaminobenzoate (DMAEB) as the hydrogen donor was further added to the composition in Example 16. The results are shown in Table 1.

Example 18

0.5 Part by weight of benzophenone, 0.1 part by weight of 9,10-bis(n-octanoyloxy)anthracene and 0.5 part by weight of IRGACURE 651 (manufactured by BASF) were added to 100 parts by weight of polyethylene glycol diacrylate (A-400 manufactured by Shin Nakamura Chemical Co., Ltd.) and stirred at room temperature until the solid content disappeared to obtain a photopolymerizable composition.

Light DSC measurement of the photopolymerizable composition was conducted, whereupon the gross heating value in one minute from initiation of light irradiation was 211 mJ/mg. The light wavelength was 405 nm, and the illuminance was 10 mW/cm$^2$.

Example 19

Light DSC measurement of the same photopolymerizable composition as in Example 2 was conducted except that the light wavelength was 365 nm at the time of light DSC measurement in Example 2, whereupon the gross heating value in one minute from initiation of light irradiation was 85.9 mJ/mg.

Example 20

The photopolymerizable composition used in Example 1 was sandwiched between glass plates via a silicone spacer having a thickness of 0.5 mm, irradiated with LED light having a center wavelength of 395 nm with an illuminance of 50 mW/cm$^2$ from one glass surface for 3 minutes. The composition was cured by light irradiation, and by removing the glass plates, a sheet formed of the cured composition was obtained. The yellowness of the sheet was 2.1, and the degree of yellowing of the cured product was low.

Comparative Examples 1 to 11

Compositions were prepared in the same manner as in Examples 1 to 11 except that the compound having an anthracene skeleton was not used, and light DSC measurement was conducted under the same conditions, whereupon the gross heating values in one minute from initiation of light irradiation were as identified in Table 2.

Comparative Examples 12, 13 and 14

Compositions were prepared in the same manner as in Examples 13, 18 and 19 except that the compound having an anthracene skeleton was not used, and light DSC measurement was conducted under the same conditions, whereupon the gross heating values in one minute from initiation of light irradiation were as identified in Table 2.

TABLE 1

| | Light wavelength nm | Radical polymerizable compound | Compound having benzophenone skeleton | Compound having anthracene skeleton | Hydrogen-donating compound | Photoradical polymerization initiator | Gross heating value in one minute mJ/mg |
|---|---|---|---|---|---|---|---|
| Example 1 | 405 | TMPTA | BP | DOA | Nil | Nil | 6.2 |
| Example 2 | | | MBB | | | | 3.0 |
| Example 3 | | | BMS | | | | 37.6 |
| Example 4 | | | PBZ | | | | 9.1 |
| Example 5 | | | BP | | DMAEB | | 42.3 |
| Example 6 | | | MBB | | | | 16.6 |
| Example 7 | | | BMS | | | | 234.0 |
| Example 8 | | | PBZ | | | | 189.0 |
| Example 9 | | A-400 | BP | | Nil | | 94.3 |
| Example 10 | | | MBB | | | | 19.3 |
| Example 11 | | | BMS | | | | 42.5 |
| Example 12 | | | BP | DBA | | | 35.6 |
| Example 13 | | APG-400 | BP | DOA | | | 21.4 |
| Example 14 | | TMPTA | BMS | DAA | Nil | | 61.5 |
| Example 15 | | | | | DMAEB | | 216.0 |
| Example 16 | | | | DBCA | Nil | | 67.8 |
| Example 17 | | | | | DMAEB | | 188.0 |
| Example 18 | | A-400 | BP | DOA | Nil | IRGACURE 651 | 211.0 |
| Example 19 | 365 | TMPTA | MBB | DOA | Nil | Nil | 85.9 |

BP: Benzophenone
MBB: Methyl 2-benzoylbenzoate
BMS: 4-Benzoyl 4'-methyldiphenylsulfide
PBZ: 4-Phenylbenzophenone
TMPTA: Trimethylolpropane triacrylate
A-400: Polyethylene glycol diacrylate (manufactured by Shin Nakamura Chemical Co., Ltd.)
APG-400: Polypropylene glycol diacrylate (manufactured by Shin Nakamura Chemical Co., Ltd.)
DMAEB: Ethyl N,N-dimethylaminobenzoate
IRGACURE 651: 2,2-Dimethoxy-1,2-diphenylethan-1-one (manufacturd by BASF)
DOA: 9,10-Bis(n-octanoyloxy)anthracene
DAA: 9,10-Bis(acetyloxy)anthracene
DBCA: 9,10-Bis(isobutyloxycarbonyloxy)anthracene
DBA: Anthracene-9,10-dibutyl ether

TABLE 2

| | Light wavelength nm | Radical polymerizable compound | Compound having benzophenone skeleton | Compound having anthracene skeleton | Hydrogen-donating compound | Photoradical polymerization initiator | Gross heating value in one minute mJ/mg |
|---|---|---|---|---|---|---|---|
| Comparative Example 1 | 405 | TMPTA | BP | Nil | Nil | Nil | 3.5 |
| Comparative Example 2 | | | MBB | | | | 0.0 |
| Comparative Example 3 | | | BMS | | | | 17.1 |
| Comparative Example 4 | | | PBZ | | | | 0.0 |
| Comparative Example 5 | | | BP | | DMAEB | | 0.6 |

TABLE 2-continued

| | Light wavelength nm | Radical polymerizable compound | Compound having benzophenone skeleton | Compound having anthracene skeleton | Hydrogen-donating compound | Photoradical polymerization initiator | Gross heating value in one minute mJ/mg |
|---|---|---|---|---|---|---|---|
| Comparative Example 6 | | | MBB | | | | 0.0 |
| Comparative Example 7 | | | BMS | | | | 172.0 |
| Comparative Example 8 | | | PBZ | | | | 80.9 |
| Comparative Example 9 | | A-400 | BP | | Nil | | 23.1 |
| Comparative Example 10 | | | MBB | | | | 2.0 |
| Comparative Example 11 | | | BMS | | | | 24.9 |
| Comparative Example 12 | | APG-400 | BP | | | | 0.0 |
| Comparative Example 13 | | TMPTA | BP | | Nil | IRGACURE 651 | 38.5 |
| Comparative Example 14 | 365 | TMPTA | MBB | | Nil | Nil | 47.2 |

BP: Benzophenone
MBB: Methyl 2-benzoylbenzoate
BMS: 4-Benzoyl 4'-methyldiphenylsulfide
PBZ: 4-Phenylbenzophenone
TMPTA: Trimethylolpropane triacrylate
A-400: Polyethylene glycol diacrylate (manufactured by Shin Nakamura Chemical Co., Ltd.)
APG-400: Polypropylene glycol diacrylate (manufactured by Shin Nakamura chemical Co., Ltd.)
DMAEB: Ethyl N,N-dimethylaminobenzoate
IRGACURE 651: 2,2-Dimethoxy-1,2-diphenylethan-1-one (manufactured by BASF)

As evident from comparison between Examples 1 to 4 and Comparative Examples 1 to 4, by addition of the compound having an anthracene skeleton, the gross heating value in one minute was increased in all Examples as compared with Comparative Examples, and it is found that polymerization by light irradiation was enhanced. Such a tendency is apparent also by comparison between Examples 5 to 8 and Comparative Examples 5 to 8, in which a hydrogen-donating compound was added. Further, such a tendency is apparent also by comparison between Examples 9 to 11 and 13, and Comparative Examples 9 to 12, in which the radical polymerizable compound was changed. Further, as evident from comparison between Example 12 and Comparative Example 9, between Examples 14 and 16 and Comparative Example 3, and between Examples 15 and 17 and Comparative Example 7, polymerization by light irradiation was enhanced also in a case where anthracene-9,10-dibutyl ether (compound DBA), 9,10-bis(acetyloxy)anthracene (compound DAA) or 9,10-bis(isobutyloxycarbonyloxy)anthracene (compound DBCA) was used as the compound having an anthracene skeleton instead of 9,10-bis(n-octanoyloxy)anthracene (compound DOA).

The polymerization-enhancing effect by addition of the compound having an anthracene skeleton is apparent also by comparison between Example 19 and Comparative Example 14 in which the light wavelength was changed to 365 nm. Further, this is apparent also from comparison between Example 18 and Comparative Example 13 in which a radical polymerization initiator such as IRGACURE 651 was further added.

From these results, it is considered that a compound having a specific anthracene skeleton has synergistic effects on benzophenone or a compound having a benzophenone skeleton and amplifies and intensifies its photoreaction and photoexcitation.

INDUSTRIAL APPLICABILITY

The photopolymerizable composition comprising a compound having an anthracene skeleton represented by the formula (1), a compound having a benzophenone skeleton and a radical polymerizable compound of the present invention is an industrially very useful photopolymerizable composition which is sensitized to energy rays containing light having a wavelength within a range of from 300 nm to 500 nm and can be quickly cured, and a cured product of which is less colored.

The invention claimed is:
1. A photopolymerizable composition, comprising:
a compound having a benzophenone skeleton;
a radical polymerizable compound; and
a compound having an anthracene skeleton of formula (1):

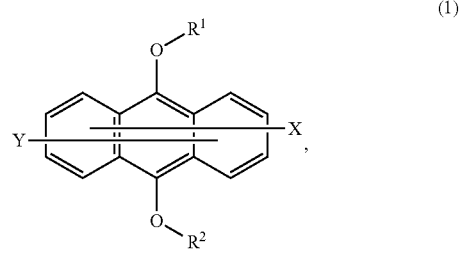

(1)

wherein:
each of $R^1$ and $R^2$ is independently a $C_{6-20}$ aryl group, an alkylcarbonyl group having a $C_{1-20}$ alkyl group, an arylcarbonyl group having a $C_{6-20}$ aryl group, an alkyloxycarbonyl group having a $C_{1-20}$ alkyl group, or an aryloxycarbonyl group having a $C_{6-20}$ aryl group, and each of X and Y is independently a hydrogen atom or a $C_{1-8}$ alkyl group.

2. The photopolymerizable composition according to claim 1, further comprising:
a hydrogen-donating compound.

3. The photopolymerizable composition according to claim 1, further comprising:
a hydrogen-donating compound,
wherein the hydrogen-donating compound is a compound having at least one functional group selected from the group consisting of an amino group, a hydroxy group, an ether bond and a mercapto group in its molecule.

4. The photopolymerizable composition according to claim 1, further comprising:
a photoradical polymerization initiator other than the compound having a benzophenone skeleton and the compound having an anthracene skeleton.

5. The photopolymerizable composition according to claim 1, further comprising:
a photoradical polymerization initiator other than the compound having a benzophenone skeleton and the compound having an anthracene skeleton,
wherein the photoradical polymerization initiator is a compound in which a molecule thereof is cleaved by light irradiation to generate radicals.

6. The photopolymerizable composition according to claim 1, wherein the radical polymerizable compound is a compound having at least one ethylenic unsaturated bond.

7. A method for producing a cured product, the method comprising:
irradiating the photopolymerizable composition of claim 1 with energy rays.

8. A method for producing a cured product, the method comprising:
irradiating the photopolymerizable composition of claim 1 with energy rays,
wherein the energy rays comprise light having a wavelength within a range of from 300 nm to 500 nm.

9. A photopolymerizable composition, comprising:
a radical polymerizable compound;
a compound having an anthracene skeleton of formula (1):

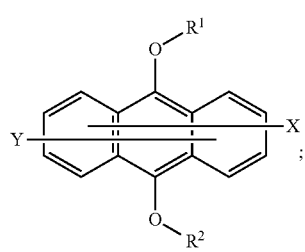

and
a compound having a benzophenone skeleton of formula (2):

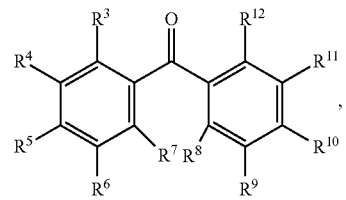

wherein:
each of $R^1$ and $R^2$ is independently a $C_{6-20}$ aryl group, an alkylcarbonyl group having a $C_{1-20}$ alkyl group, an arylcarbonyl group having a $C_{6-20}$ aryl group, an alkyloxycarbonyl group having a $C_{1-20}$ alkyl group, or an aryloxycarbonyl group having a $C_{6-20}$ aryl group;
each of X and Y is independently a hydrogen atom or a $C_{1-8}$ alkyl group;
each of $R^3$ to $R^{12}$ is independently a hydrogen atom, an alkyl group, an alkoxy group, an acyl group, an acyloxy group, an aryl group, an aryloxy group, a hydroxy group, a carboxy group, a sulfonic acid group, an alkylthio group, an arylthio group, an amino group, a halogen atom or a vinyl group, two substituents adjacent to each other via a carbon atom on the aromatic ring is optionally bonded to form a cyclic structure together with the carbon atom; and
$R^7$ and $R^8$ are optionally bonded directly or via an oxygen atom to form a cyclic structure together with the carbon atom.

10. The photopolymerizable composition according to claim 9, further comprising:
a hydrogen-donating compound.

11. The photopolymerizable composition according to claim 9, further comprising:
a hydrogen-donating compound,
wherein the hydrogen-donating compound is a compound having at least one functional group selected from the group consisting of an amino group, a hydroxy group, an ether bond and a mercapto group in its molecule.

12. The photopolymerizable composition according to claim 9, further comprising:
a photoradical polymerization initiator other than the compound having a benzophenone skeleton and the compound having an anthracene skeleton.

13. The photopolymerizable composition according to claim 9, further comprising:
a photoradical polymerization initiator other than the compound having a benzophenone skeleton and the compound having an anthracene skeleton,
wherein the photoradical polymerization initiator is a compound in which a molecule thereof is cleaved by light irradiation to generate radicals.

14. The photopolymerizable composition according to claim 9, wherein the radical polymerizable compound is a compound having at least one ethylenic unsaturated bond.

15. A method for producing a cured product, the method comprising:
irradiating the photopolymerizable composition of claim 9 with energy rays.

16. A method for producing a cured product, the method comprising:
irradiating the photopolymerizable composition of claim 9 with energy rays, wherein the energy rays comprise light having a wavelength within a range of from 300 nm to 500 nm.

* * * * *